Figure 1:
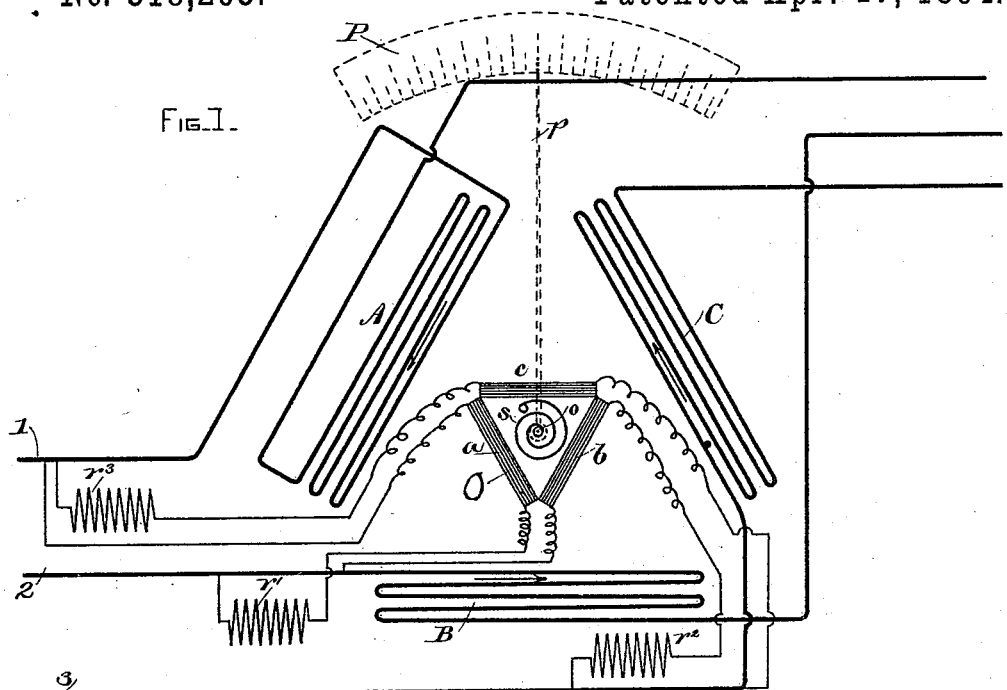

(No Model.) 2 Sheets—Sheet 1.

E. W. MIX.
ELECTRIC MEASURING INSTRUMENT FOR MULTIPHASE SYSTEMS.

No. 518,265. Patented Apr. 17, 1894.

WITNESSES.
Alec A. Macdonald
A. C. Crane

INVENTOR.
Edgar W. Mix
By Bentley & Blodgett
Attys.

(No Model.) 2 Sheets—Sheet 2.
E. W. MIX.
ELECTRIC MEASURING INSTRUMENT FOR MULTIPHASE SYSTEMS.
No. 518,265. Patented Apr. 17, 1894.
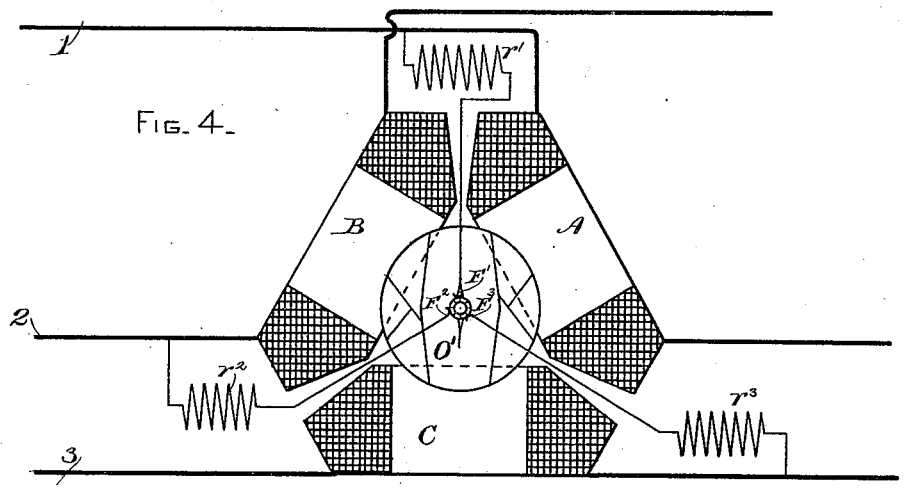
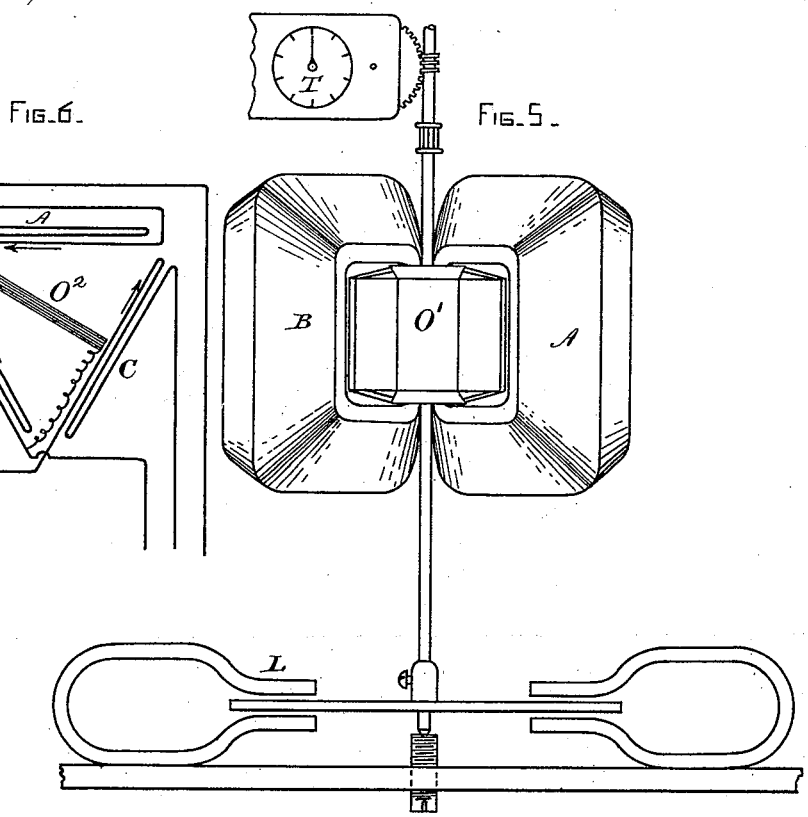
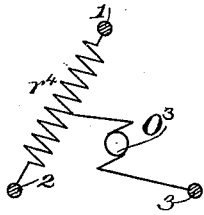
WITNESSES.
INVENTOR.

UNITED STATES PATENT OFFICE.

EDGAR W. MIX, OF LYNN, MASSACHUSETTS, ASSIGNOR TO THE THOMSON-HOUSTON ELECTRIC COMPANY, OF CONNECTICUT.

ELECTRIC MEASURING-INSTRUMENT FOR MULTIPHASE SYSTEMS.

SPECIFICATION forming part of Letters Patent No. 518,265, dated April 17, 1894.

Application filed March 21, 1892. Serial No. 425,701. (No model.)

*To all whom it may concern:*

Be it known that I, EDGAR W. MIX, a citizen of the United States, residing at Lynn, county of Essex, State of Massachusetts, have invented certain new and useful Improvements in Electric Measuring-Instruments for Multiphase Systems, of which the following is a specification.

This invention relates to an electric measuring instrument for multi-phase systems of electric distribution. Such systems comprise three or more mains or supply lines carrying currents of different phase and connected together through translating devices in such manner that a circuit or circuits exist through such devices from each of the mains to each of the other mains. The translating devices thus included may be the several coils of a multi-phase motor, in which case their relations to the main lines are symmetrical, and the variations in load on the motor, as they influence the several coils equally, will be symmetrical or equally distributed on the several mains; or said translating devices may be disassociated and independently variable devices such as electric lamps, in which case the circuits between the several mains may be differently affected by changes of load as by turning out lights, and hence the currents will be unequally distributed in the several mains.

The object of my invention is to provide a device which shall be responsive to the total load upon a multi-phase system, or in other words shall indicate or measure the total energy transmitted by the mains whether the same is equally or unequally distributed.

In the preferred embodiment of my invention, coils, equal in number to the number of phases of current in the system and included respectively in the several mains are arranged in proximity to one another in such manner as to develop a rotary magnetic field due to the progressively shifting alternating currents in said coils. In this field is placed an armature having a number of coils connected in circuits passing across from main to main in shunt with the translating devices. These coils tend to set up a rotary polarity in the armature, said polarity rotating in the same direction as that in the field. The positions and arrangements of the parts are such that this polarity of the armature is non-coincident in direction with that of the field, and the torque in and movement of the armature results from the mutual reactions of these two displaced polarities and depends on, or is proportional to, the energy of the currents passing through the instrument.

My invention also includes broadly the application of a rotary magnetic field produced by non-coincident coils in the several circuits in order to produce in an armature acted upon by said field a torque dependent upon the currents in the several circuits.

It will be understood that my invention as above outlined is applicable to either the temporary indication or the permanent registration of the energy of multi-phase currents.

Figure 2:
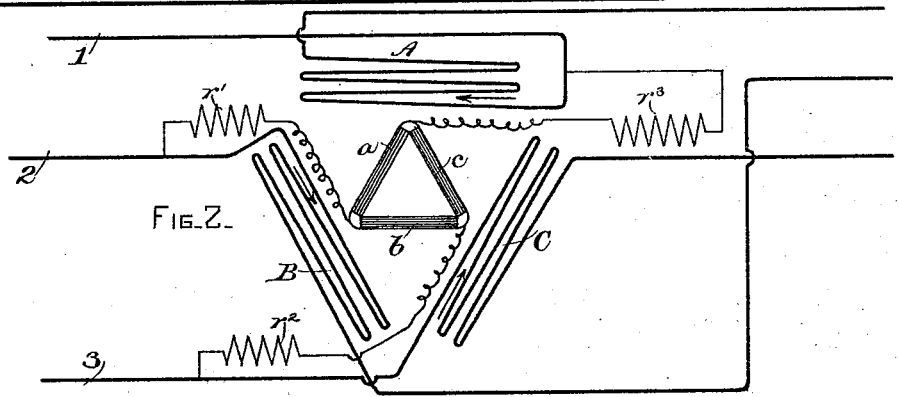
Figure 3:
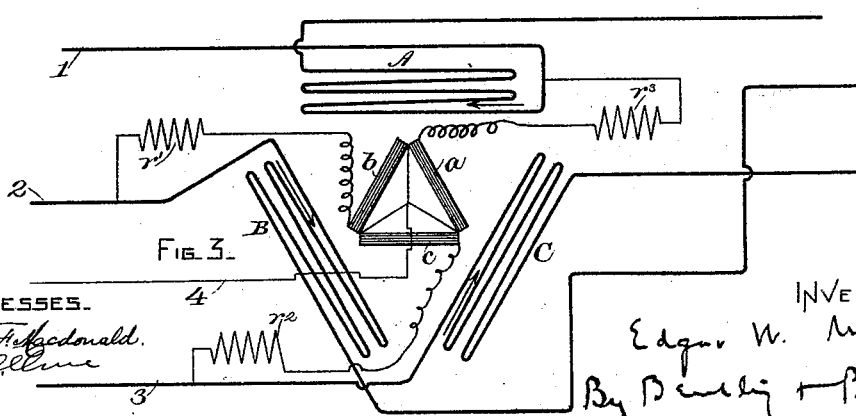

In the accompanying drawings Figure 1 is a diagram of a Watt indicator embodying my invention. Figs. 2 and 3 are similar views showing modified armature windings. Fig. 4 is a horizontal section of a Watt meter embodying my invention. Fig. 5 is a side elevation of the same, the nearer field coils being removed. Figs. 6, 7 and 8 show modified armature windings and connections.

I have illustrated my invention only as applied to a three phase system, but it is obviously applicable to multi-phase systems of any kind and the following description of a three phase indicator will sufficiently disclose the principle of the invention.

In Fig. 1 the three phase lines or mains 1, 2 and 3 respectively include three coils A, B, C arranged around a space so as to develop therein a rotary field as the alternating currents in said mains progressively shift from coil to coil. The strength of current in these coils and therefore the strength of the rotating field developed thereby depends upon the current passing through the several mains. In the aforesaid field is placed an armature O having three coils $a$, $b$, $c$ placed with relative angular displacement around a common center, symmetrically and connected in shunt circuit across the mains as follows: Coil $a$ is connected in a circuit from line 1 to line 2 including a resistance $r'$, coil $b$ is connected in the circuit from line 2 to line 3 including a resistance $r^2$, coil $c$ is connected in the circuit from line 1 to line 3 including a resistance $r^3$. Of course the resistance of each of these armature circuits should be considerable so as to have no short-circuiting action on the main lines. The current which passes in each of the armature coils is proportional to the difference of potential between the two lines which it connects, and as these currents are progressively shifted from coil to coil of the armature a rotating polarity is set up which is dependent upon the several electro-motive forces in the armature circuits. The field magnetism and the armature polarity therefore rotate in the same direction with a velocity which is determined by the rate of alternation of the muti-phase currents, but the position of the armature coils before commencing to move and their connections to the lines are such that the polarity developed thereby is at an angle to, or non-coincident with, the polarity of the field. Thus with the coils arranged as shown in Fig. 1 if the resultant polarity of the field at a given instant is vertical that of the armature will be horizontal and as the field polarity rotates the armature polarity will likewise rotate and be constantly at right angles thereto. Under these circumstances a torque will be produced on the armature tending to make it set its polarity parallel with that of the field and this torque will be dependent upon the field strength and therefore upon the quantity of current passing in the several circuits and will also be dependent upon the strength of the armature polarity and therefore upon the respective differences of potential between the several circuits. The armature is mounted on a pivot $o$ and is provided with a suitable retractor such as spring $s$ opposing its movement under the aforesaid torque with a force dependent on the displacement of the armature from its original position. The armature being provided with a pointer $p$ moving over a scale P the amount of deflection indicates the amount of torque and quantity of energy being consumed.

In Fig. 2 the armature connections are modified by including the resistances $r'$, $r^2$, $r^3$ in each of the connections from the armature coils to the lines. As in Fig. 1 the armature coils are connected on what is called the closed interlinking, but in Fig. 1 the closed chain through the armatures includes the several resistances while in Fig. 2 the closed chain includes the armature coils only, the resistances being placed in the connections to the mains. A well known equivalent of this closed interlinking is the open interlinking shown in Fig. 3, wherein each armature coil has one terminal leading to a common junction while the other terminals are connected to the respective main lines through resistances $r'$, $r^2$, $r^3$.

The principles of operation above described apply also to the registering watt-meter shown in Figs. 4 and 5 wherein A, B, C are the field coils connected to the main line wires 1, 2, 3, and arranged to set up a rotating field dependent on the strength of the several main line currents, while the armature O' has three coil portions connected respectively in shunts across the mains according to either of the plans illustrated in Figs. 1, 2, and 3 so as to develop a rotating polarity dependent upon the electro-motive forces between the several lines. In order to enable continuous revolution of the armature under the torque thus produced it is necessary to so apply the currents thereto that the revolution of the armature as a body shall not cause revolution of the armature polarity, in other words the armature polarity must not be allowed to catch up or move around into parallelism with the field polarity. For this purpose the armature winding, preferably a continuous drum winding, is connected at intervals to a segmental commutator the number of connections and segments being as large as desired. On this commutator there are three brushes F', $F^2$, $F^3$, equi-distant and connected respectively to the three main lines. Multi-phase currents from the three lines therefore enter the armature coil at three equi-distant points, thus dividing the coil into three portions whose position in space remains unchanged or practically so, while the coil itself is revolving. These three armature coil-portions therefore always tend to develop a polarity having a certain displacement relative to the field polarity, and a continuous rotation is thereby set up in obvious manner. Any suitable retarding device or load such as magnetic retarder L may be applied to this meter and a register T is also connected therewith. The armature rotating under the mutual reactive effect of the main line currents circulating in the field coils and the shunt currents in the armature coils will indicate on the register T the integrated product of current, electro-motive force and time for the several circuits.

It will be noticed that the integration of the field strengths is effected by the arrangement of the field coils in proximity to one another in such manner that the lines of force developed at any instant by any coil pass through the armature in the same direction as the resultant lines of force due to the other coils. This same principle is applicable even if the other element, the armature, consists of but a single coil, as shown in Fig. 6. Here the rotating field whose strength is dependent on the current strengths in the several lines acts on a single coil armature $O^2$ connected between two of the lines. The action in this case is intermittent, being *nil* when the field and armature polarities are parallel and being at a maximum when they are at right angles with one another. Other methods may be adopted for rendering the armature responsive to the several electro-motive forces between the lines or to two at least of said electro-motive forces. Thus in Fig. 7 a resistance $r^4$ connects two of the lines 1 and 2 while an armature coil $O^3$ is connected to an intermediate point and to the other line 3, this in fact is like the open interlinking of Fig. 3 except that the two portions of the resistance $r^4$ take the place of the other armature coils, and the amount of current flowing in this armature coil $O^3$ is dependent on the several electro-motive forces between the line wires 1, 2 and 3. A similar result is obtained by the connections shown in Fig. 8 wherein resistances $r^5$, $r^6$ are connected respectively between lines 1 and 2 and 1 and 3, the armature coil $O^4$ being connected to said resistances at different distances from line 1 so that electro-motive forces between any two of the lines will influence the armature.

Of course it will be understood that the terms armature and field as herein used are convertible or interchangeable. Thus if the term field is taken to mean the stationary magnetic field it is clear that it may be produced by and be responsive to shunt circuits between the lines, the armature coils being in that case in the main circuit. Furthermore if only one of the polarities is magnetically rotated by the progressively shifting action of the coils this rotating polarity may be developed either in the mechanically fixed element or in the moving element and may be due to either shunt or series coils.

When the open interlinking arrangement of Fig. 3 is adopted, a return connection 4 may lead from the common junction of the armature coils to a similar junction elsewhere in the circuit, in accordance with the usual practice.

What I claim as new, and desire to secure by Letters Patent, is—

1. An electric measuring instrument for multi-phase systems, having relatively movable field and armature elements, one of said elements having a number of coil portions included respectively in the several multi-phase lines, and the other element having coil portions connected respectively to the several lines, so as to form cross circuits between them.

2. An electric measuring instrument for multi-phase systems, having relatively movable field and armature elements, each of said elements having a number of angularly displaced coils acting in different directions, the coils of one element connected respectively in the several multi-phase lines, and the coils of the other element connected in several circuits across the multi-phase lines.

3. An electric measuring instrument for multi-phase systems, having relatively movable field and armature elements, one of said elements having angularly displaced coils connected respectively in the several multi-phase lines, and the other element having coils acting in different directions connected in circuits across said lines, said two elements being relatively arranged so as to produce resultant polarities which are non-coincident, and which revolve in the same direction.

4. An electric measuring instrument for multi-phase systems, having relatively movable field and armature sets of coils connected respectively in circuit with, and in shunt across, the several lines, and arranged to produce two non-coincident polarities revolving in the same direction.

5. An electric measuring instrument for multiphase systems, having relatively movable field and armature elements, one of said elements having a number of coil portions included respectively in the several multi-phase lines, and the other element having coil portions connected respectively to the several lines so as to form cross circuits between them, and a resistance coil modifying the current flowing in cross circuits, substantially as described.

6. An electric measuring instrument for multiphase systems, having relatively movable field and armature elements, one of said elements having a number of coil portions included respectively in the several multi-phase lines, and the other element having coil portions connected respectively to the several lines so as to form cross circuits between them, and a resistance in each of said cross circuits in series with the coil portions therein, substantially as described.

In testimony whereof I have hereto set my hand this 4th day of March, 1892.

EDGAR W. MIX.

Witnesses:
 ARTHUR P. KNIGHT,
 C. L. HAYNES.